US012646477B2

(12) United States Patent
Hsu

(10) Patent No.: US 12,646,477 B2
(45) Date of Patent: Jun. 2, 2026

(54) DRIVING METHOD FOR DISPLAY PANEL, DISPLAY DRIVING DEVICE, AND DISPLAY DEVICE

(71) Applicant: NOVATEK MICROELECTRONICS CORP., Hsinchu (CN)

(72) Inventor: Chia-Lun Hsu, Hsinchu (CN)

(73) Assignee: NOVATEK MICROELECTRONICS CORP., Taiwan (CN)

( * ) Notice: Subject to any disclaimer, the term of this patent is extended or adjusted under 35 U.S.C. 154(b) by 0 days.

(21) Appl. No.: 19/219,515

(22) Filed: May 27, 2025

(65) Prior Publication Data

US 2026/0105894 A1 Apr. 16, 2026

Related U.S. Application Data

(60) Provisional application No. 63/707,726, filed on Oct. 15, 2024.

(30) Foreign Application Priority Data

Feb. 11, 2025 (CN) ......................... 202510150334.5

(51) Int. Cl.
*G09G 3/34* (2006.01)
*G09G 3/00* (2006.01)

(52) U.S. Cl.
CPC ........... *G09G 3/3426* (2013.01); *G09G 3/006* (2013.01); *G09G 2310/0267* (2013.01); (Continued)

(58) Field of Classification Search
CPC ................. G09G 3/3426; G09G 3/006; G09G 2310/0267; G09G 2310/08; G09G 2330/06; G09G 2330/12
See application file for complete search history.

(56) References Cited

U.S. PATENT DOCUMENTS 8,384,648 B2 * 2/2013 Cho ..................... G09G 3/3677 345/100
2007/0080905 A1 4/2007 Takahara
(Continued)

FOREIGN PATENT DOCUMENTS

CN 1573852 A * 2/2005 ........... G09G 3/3614
CN 117831464 A * 4/2024 ........... G09G 3/3266
(Continued)

OTHER PUBLICATIONS

Office Action, corresponding Taiwan application No. 114119574, dated Jan. 29, 2026.

*Primary Examiner* — Ricardo Osorio
(74) *Attorney, Agent, or Firm* — MARSHALL, GERSTEIN & BORUN LLP

(57) ABSTRACT

A driving method for a display panel, display driving device, and display device are provided. The method includes: in a first clock cycle, displaying to-be-displayed data for (N−M)-th pixel row and obtaining to-be-displayed data for N-th pixel row expected to be displayed after a preset delay period from a start time of the first clock cycle, the preset delay period lasting for M clock cycles; and providing gate driving signals for (N−M+1)-th to (N1−1)-th pixel rows and inhibiting providing gate driving signals for N1-th to N2-th pixel rows in response to an error event in the to-be-displayed data for N-th pixel row, wherein a gate driving signal for each pixel row includes a pre-charging period and a displaying period, the pre-charging period lasts for Q clock cycles, and wherein N−M+Q+1≤N1≤N, and N≤N2≤T (a number of the plurality of pixel rows).

18 Claims, 5 Drawing Sheets

400

(52) U.S. Cl.
CPC ..... *G09G 2310/08* (2013.01); *G09G 2330/06* (2013.01); *G09G 2330/12* (2013.01)

(56) References Cited

U.S. PATENT DOCUMENTS

| | | | | |
|---|---|---|---|---|
| 2012/0249442 | A1* | 10/2012 | Chang | G06F 3/04166 345/173 |
| 2013/0257917 | A1* | 10/2013 | Peng | G09G 3/20 345/690 |
| 2015/0161959 | A1* | 6/2015 | Hsu | G09G 3/3611 345/204 |
| 2016/0307529 | A1* | 10/2016 | Tseng | G09G 3/3258 |

FOREIGN PATENT DOCUMENTS

| | | | |
|---|---|---|---|
| TW | 200424995 | A | 11/2004 |
| TW | 202240562 | A | 10/2022 |
| TW | 202429692 | A | 7/2024 |

* cited by examiner

DRIVING METHOD FOR DISPLAY PANEL, DISPLAY DRIVING DEVICE, AND DISPLAY DEVICE

TECHNICAL FIELD

The present disclosure relates to the field of display technology, and more particularly, to a driving method for a display panel, a display driving device, and a display device.

BACKGROUND

In current display technology, the display driving device in an electronic device receives to-be-displayed data (such as image data or video frame data) for each pixel circuit on the display panel, processes the to-be-displayed data, and then provides the processed to-be-displayed data to each pixel circuit on the display panel for display.

However, since various interfaces of the display driving device may be subject to various interference events, which may result errors in the to-be-displayed data acquired by the display driving device. A typical interference event is an electrostatic discharge (ESD) event.

ESD event is an important issue to be considered in the electronics field. ESD events are caused by a buildup of electrostatic charge between two conductive materials, where one material becomes positively charged and the other material become negatively charged. When one of the electrically charged materials comes into contact with another conductive material, the built up static charge will be transferred to the other conductive material, resulting in an ESD event. The display panel in the electronic device typically includes multiple delicate electronic components in close proximity, such as multiple pixel circuits arranged closely and capacitive components and transistor components in each pixel circuit arranged closely. The ESD events may disrupt the balance of a conductive layer and may generate a momentary high voltage, which may interfere with the normal operation of the display driving device via the interfaces of the display driving device, causing errors in the to-be-displayed data received by the display driving device of the electronic device, thereby causing the display effect of the display panel to be unexpected, that is, the display abnormality is perceived by the user. In addition, in a specific application scenario, when the display panel is a touch and display panel used to display important information in a car, these ESD events may greatly affect the driver's operation, thereby affecting driving safety.

SUMMARY

In view of this, in order to solve the problems of the prior art, the embodiments of the present disclosure provide a method for driving a display panel, a display driving device, and an electronic device, which can alleviate the problem of display abnormality due to various interference events that the display driving device may suffer.

According to an aspect of the present disclosure, there is provided a method for driving a display panel comprising a plurality of pixel rows, the method comprising: displaying to-be-displayed data for (N−M)-th pixel row and obtaining to-be-displayed data for N-th pixel row in a first clock cycle, the to-be-displayed data for N-th pixel row being expected to be displayed after a preset delay period from a start time of the first clock cycle, and the preset delay period lasting for M clock cycles; and providing, in response to an error event in the to-be-displayed data for N-th pixel row, gate driving signals for (N−M+1)-th to (N1−1)-th pixel rows and inhibiting providing gate driving signals for N1-th to N2-th pixel rows, wherein a gate driving signal for each pixel row includes a pre-charging period and a displaying period, and the pre-charging period lasts for Q clock cycles, and Q is less than M, and wherein N1 is greater than or equal to N−M+Q+1 and less than or equal to N, and N2 is greater than or equal to N and less than or equal to a number of the plurality of pixel rows.

According to another aspect of the present disclosure, a display driving device is provided for driving a display panel including a plurality of pixel rows, the display driving device comprising a signal processing circuit and an error detection circuit. The signal processing circuit is configured to: display to-be-displayed data for (N−M)-th pixel row and obtaining to-be-displayed data for N-th pixel row in a first clock cycle, the to-be-displayed data for N-th pixel row being expected to be displayed after a preset delay period from a start time of the first clock cycle, and the preset delay period lasting for M clock cycles. The error detection circuit is configured to detect an error event for each acquired to-be-displayed data when activated. The signal processing circuit is further configured to provide, in response to the error event in the to-be-displayed data for the (N-th) pixel row, gate driving signals to (N−M+1)-th to (N1−1)-th pixel rows and inhibit providing gate driving signals to N1-th to N2-th pixel rows, where a gate driving signal of each pixel row includes a pre-charging period and a displaying period, and the pre-charging period lasts for Q clock cycles, and Q is less than M, and where N1 is greater than or equal to N−M+Q+1 and less than or equal to N, and N2 is greater than or equal to N and less than or equal to a number of the plurality of pixel rows.

In accordance with yet another aspect of the present disclosure, there is also provided a display device including: a display panel; and the above-described display driving device for driving the display panel.

According to the embodiments of the present disclosure, by stopping the gate driving signals for pixel rows on a pixel row basis, it is possible to turn off the gates of pixels on the N-th pixel row corresponding to the to-be-displayed data where the error event occurs and its related pixel rows in advance, so that there will be no gate driving signal that stops in the pre-charging period during the display driving process. Therefore, it is possible to avoid display abnormalities occurring in the gate driving scheme based on pre-charging solution (in which the display abnormalities are caused by the fact that: some pixel rows are pre-charged only during the pre-charging period but pixels are not charged to the corresponding expected pixel voltages corresponding to the to-be-displayed data, so the to-be-displayed data cannot be displayed during the displaying period).

BRIEF DESCRIPTION OF DRAWINGS

The accompanying drawings are included to provide a further understanding of the present disclosure, and are incorporated in and constitute a part of this specification. The drawings illustrate the embodiments of the present disclosure and serve to explain the principles of the present disclosure together with the description.

DETAILED DESCRIPTION

Figure 1:
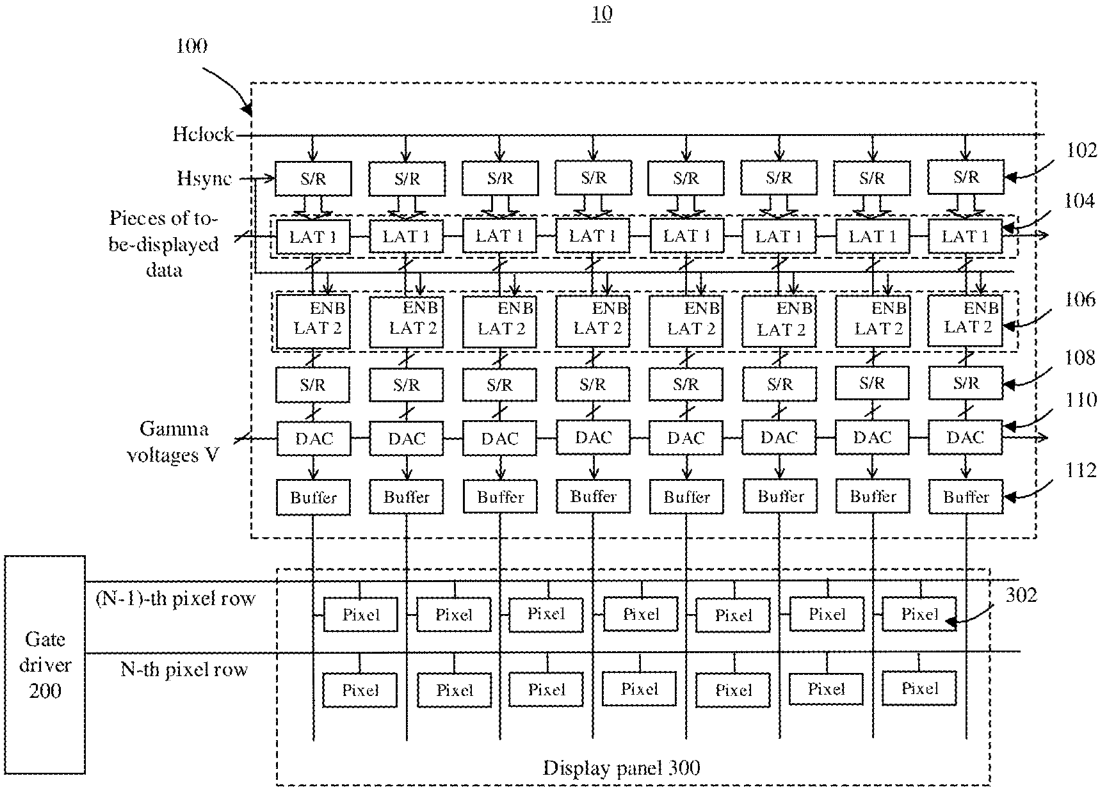
FIG. 1 is a schematic circuit block diagram illustrating an electronic device according to at least one embodiment of the present disclosure.

The term "couple (or connect)" or equivalents throughout the specification of the present disclosure, including the claims, is used broadly and encompasses both direct and indirect connections or coupling members. For example, if the present disclosure describes a first device being coupled (or connected) to a second device, it should be interpreted that the first device may be directly coupled (or connected) to the second device, or the first device may be indirectly coupled (or connected) to the second device via other means or through some coupling member. Terms such as "first" and "second" mentioned throughout the specification (including the claims) of the present disclosure are only used to name names of elements/components or to distinguish different embodiments or scopes, not intended to limit to upper or lower limits of the number of elements/components, and not intended to limit the order of elements/components. Furthermore, elements/components/steps with the same reference numerals represent the same or similar parts in the drawings and embodiments. Elements/components/steps with the same reference numbers in different embodiments may refer to the associated description. Expressions in the singular may include expressions in the plural, and expressions in the plural may also include expressions in the singular, unless the context clearly defines otherwise.

FIG. 1 is a schematic circuit block diagram illustrating an electronic device 10 according to at least one embodiment of the present disclosure. The electronic device 10 may be a mobile device or other non-mobile device.

Referring to FIG. 1, the electronic device 10 may include a data driver 100, a gate driver 200, and a display panel 300. The data driver 100 and the gate driver 200 in FIG. 1 are shown separately, but the two can be integrated into one chip, and the present disclosure does not limit this. Optionally, the electronic device 10 may also include a processing circuit or a timing controller (not shown) to control the display operation of the display panel together with the data driver 100 and the gate driver 200.

As shown in FIG. 1, the data driver 100 includes a plurality of shift registers 102 that receive a clock signal Hclock and a data timing control signal Hsync to generate data timing signals. A plurality of shift registers (S/R) 102 are coupled to a plurality of first latches (LAT 1) 104 and a plurality of second latches (LAT 2) 106 in parallel, respectively. The plurality of first latches 104 receive pieces of display data (Data) to be displayed on the display panel (hereinafter referred to as to-be-displayed data), such as video frame data or image data, and the to-be-displayed data is latched, and then output to the plurality of second latches 106 respectively. The plurality of second latches 106 receive the data timing control signal Hsync as an enable signal for releasing the latched display data. The plurality of second latches 106 are respectively coupled in parallel to a plurality of second level shifters 108, and the plurality of second level shifters 108 are respectively coupled in parallel to a plurality of digital-to-analog converters (DACs) 110. The plurality of DACs 110 receive gamma voltages V to convert received pieces of to-be-displayed data in digital form into pieces of analog to-be-displayed data. The pieces of analog to-be-displayed data are buffered in a plurality of buffers 112 respectively, and then output to corresponding pixels 302 in the display panel 300. For example, while the plurality of second latches 106 store the to-be-displayed data for the (N−1)-th pixel row, the to-be-displayed data for N-th pixel row has been written to the plurality of first latches 104, and the to-be-displayed data for the (N−1)-th pixel row stored in the plurality of second latches 106 may be released into the plurality of second level shifters 108 in response to the enable signal at a preset timing. In the context of the present disclosure, as an example, the to-be-displayed data received by the data driver 100 or the display driving device described later is in a digital form, and the to-be-displayed data provided to the display panel is in an analog form. In addition, the obtained to-be-displayed data for N-th pixel row may include data values or data codes for respective pixels on the pixel row, and the to-be-displayed data provided to the display panel after processing includes current or voltages for respective pixels.

As shown in FIG. 1, pixels on the (N−1)-th pixel row on the shown display panel 300 display the corresponding to-be-displayed data from the buffer 112 based on the gate driving signal for the (N−1)-th pixel row from the gate driver 200, and pixels on the N-th pixel row display the corresponding to-be-displayed data from the buffer 112 based on the gate driving signal for N-th pixel row from the gate driver 200. Note that this is for illustration only, and the display panel 300 will include individual pixels arranged on a plurality of pixel rows, and each pixel may include a pixel circuit composed of transistors and capacitors. At least one of the above-described data driver 100 and gate driver 200 may be provided in an integrated circuit IC, may completely include the integrated circuit IC, or may be a part of the integrated circuit IC.

As mentioned before, the to-be-displayed data received by the data driver in the electronic device may be erroneous due to various interference events at the display driving device, for example an ESD event which causes a change in the driving current or voltage. When erroneous to-be-displayed data caused by such interference events is displayed on the display panel, it will cause display abnormalities. For example, it may be detected that the status of each register in the data driver 100 in FIG. 1 changes or that there are abnormalities in the status, or that the current value of the driving current changes, or the like, and therefore it is determined that the data driver suffers from the interference events and accordingly an error event occurs in the corresponding to-be-displayed data. Therefore, there is a need for a solution that can alleviate the problem of display abnormalities due to various interference events that the data driver may suffer.

According to some embodiments of the present disclosure, in order to avoid the error event in the to-be-displayed data due to interference events in the data driver, thereby adversely affecting the display effect, when an error is detected in the to-be-displayed data for N-th pixel row, the gates of respective pixels on the N-th pixel row can be turned off before the to-be-displayed data for N-th pixel row is displayed on the display panel, that is, the gate driving signal is not provided to these pixels. Therefore, erroneous to-be-displayed data will not be displayed on the display panel. In this case, the display data for N-th pixel row in a previous display frame that has been already displayed is still stored at the capacitors in the respective pixels, so that the pixels on the N-th pixel row can continue to display the display data for N-th pixel row in the previous display frame. Since the display data of two adjacent display frames is relatively close, the human eye cannot easily perceive that the N-th pixel row does not display the expected display effect.

In some cases, in order to turn off the gates of the pixels on the N-th pixel row accurately to ensure that erroneous to-be-displayed data is not displayed, the gates of the pixels on one or more pixel rows before and after the N-th pixel row may also be turned off. For example, the gates of the pixels on the (N−1)-th pixel row to the (N+1)-th pixel row are all turned off. In addition, considering that when the to-be-displayed data for N-th pixel row has an error event due to interference events at the data driver, the to-be-displayed data for subsequent pixel rows is also likely to have an error event due to similar interference events, so in other embodiments, the gates of the pixels on the N-th pixel row and all subsequent pixel rows may be turned off.

For a driving scheme that displays the received to-be-displayed data row by row, once the to-be-displayed data for one pixel row is completed/completely received, the to-be-displayed data will be processed and displayed on the display panel after a preset delay period. When an error event in the to-be-displayed data is detected, the gates of the pixels on the corresponding pixel row can be turned off. In this way, by setting the preset delay period, the to-be-displayed data for N-th pixel row will be masked before it is displayed on the display panel.

Figure 2:
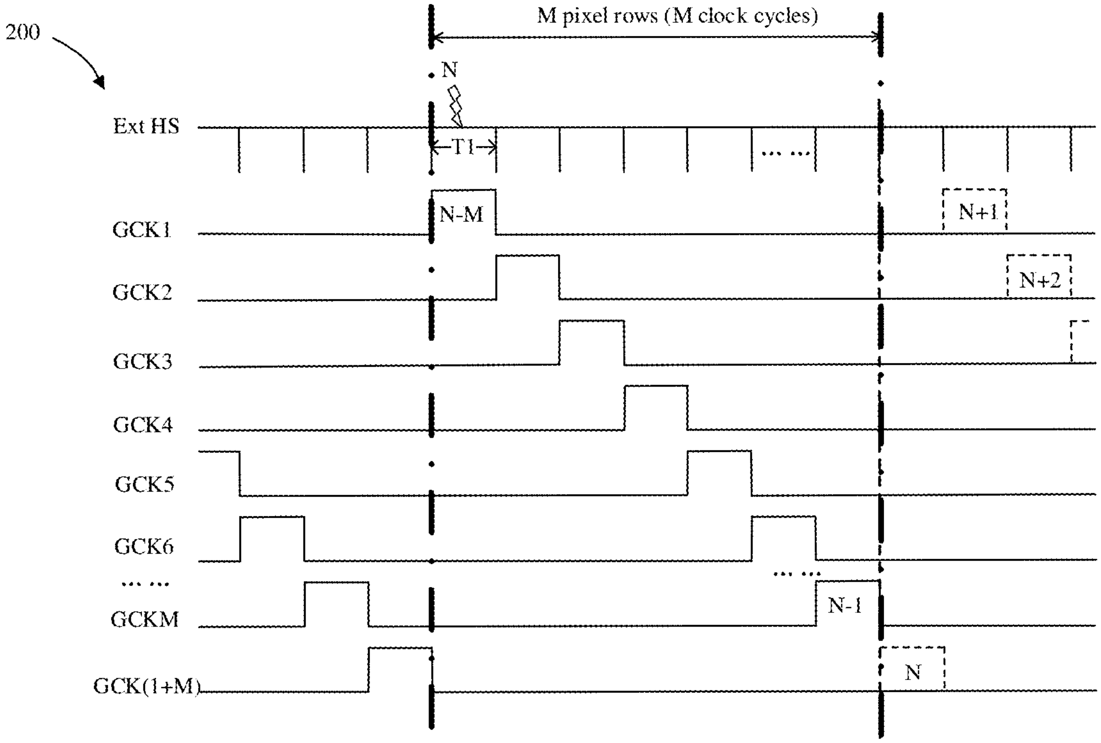
FIG. 2 is a schematic driving timing diagram illustrating a scheme for alleviating the impact of erroneous to-be-displayed data on the display effect according to at least one embodiment of the present disclosure.

For example, FIG. 2 illustrates the details of the above method. FIG. 2 is a schematic driving timing diagram illustrating a scheme for alleviating the impact of erroneous to-be-displayed data on the display effect according to at least one embodiment of the present disclosure.

The gate driving signal for each pixel row is sequentially shifted based on an external clock cycle (Ext HS, the same cycle as Hsync shown in FIG. 1), so that the gates of the pixels on each pixel row are respectively provided with a corresponding gate driving signal, for receiving and displaying data on the display panel.

Since the display panel generally includes a plurality of pixel rows and the number output terminals of the gate driver is limited, one output terminal of the gate driver may be connected to multiple pixel rows, so that the gate driving signals of the gate driver can form multiple cyclic groups over time. Furthermore, a grouping control signal may be provided for each cyclic group, for outputting the gate driving signal for one corresponding pixel row among a respective group if the grouping control signal is active, so that the gate driving signals for all the plurality of pixel rows can be output with less hardware circuits. For example, in the case where the number of output terminals is 8, the cyclic period is 8 clock cycles, each cycle group includes 8 gate driving signals, and the first output terminal can be used to output gate driving signals for 1st pixel row, the 9th pixel row, the 17th pixel row . . . ; the second output terminal can be used to output gate driving signals for 2nd pixel row, the 10th pixel row, the 18th pixel row . . . ; . . . the eighth output terminal can be used to output the gate driving signals for 8th pixel row, the 16th pixel row, and the 24th pixel row . . . . For example, the first output may provide a gate driving signal to the 1st pixel row in response to a first grouping control signal being active, and may provide a gate driving signal to the 9th pixel row in response to a second grouping control signal being active, and so on. In this way, each cyclic group corresponds to the output terminals of the gate driver sequentially outputting the gate driving signals once.

In the context of the present disclosure, through the above grouping manner, the gate driving signal provided by each output terminal includes one or more driving pulses separated in time domain, and during the driving period corresponding to each driving pulse, the gates of respective pixels on a respective pixel row are driven to be turned on. For convenience of description, the driving pulse for each pixel row of the gate driving signal is briefly described as the gate driving signal for that pixel row.

In addition, although in the example of FIG. 2, the number of output terminals of the gate driver is M+1 (M is the number of clock cycles included in the preset delay period) as an example, it should be understood that the number of pixel rows corresponding to each cycle group is not related to the value of M and can be determined according to the design of the actual gate driver.

In the embodiments of the present disclosure, for the error event in the to-be-displayed data for N-th pixel row, due to the delay between the data driver acquiring the to-be-displayed data and displaying it on the display panel, such as M clock cycles shown in FIG. 2, the gate driving signals for N-th pixel row and subsequent pixel row (s) may be inhibited from being output, from a time that M clock cycles elapse from a start time of the clock cycle in which the error event is detected (referred to herein as the first clock cycle) (i.e., from the start time of the displaying period of the N-th pixel row as shown by the dotted line in FIG. 2), and optionally, the outputting of gate driving signals for previous pixel rows may also be inhibited (if the gate driving signals for these previous pixel rows have not been generated when the error event is detected), i.e. the gates of pixels on the N-th pixel row and subsequent or previous pixel rows are turned off to ensure that the to-be-displayed data for N-th pixel row will not be displayed on the display panel.

Currently, many display panels use a pre-charging scheme in the case where the load of the display panel may be quite large. By turning on the gate of a pixel in advance, the voltage of the capacitor in the pixel is pre-charged to a higher voltage level during the pre-charging period, which allows the capacitor in the pixel to reach the voltage level corresponding to the to-be-displayed data for the pixel faster during the displaying period.

Figure 3:
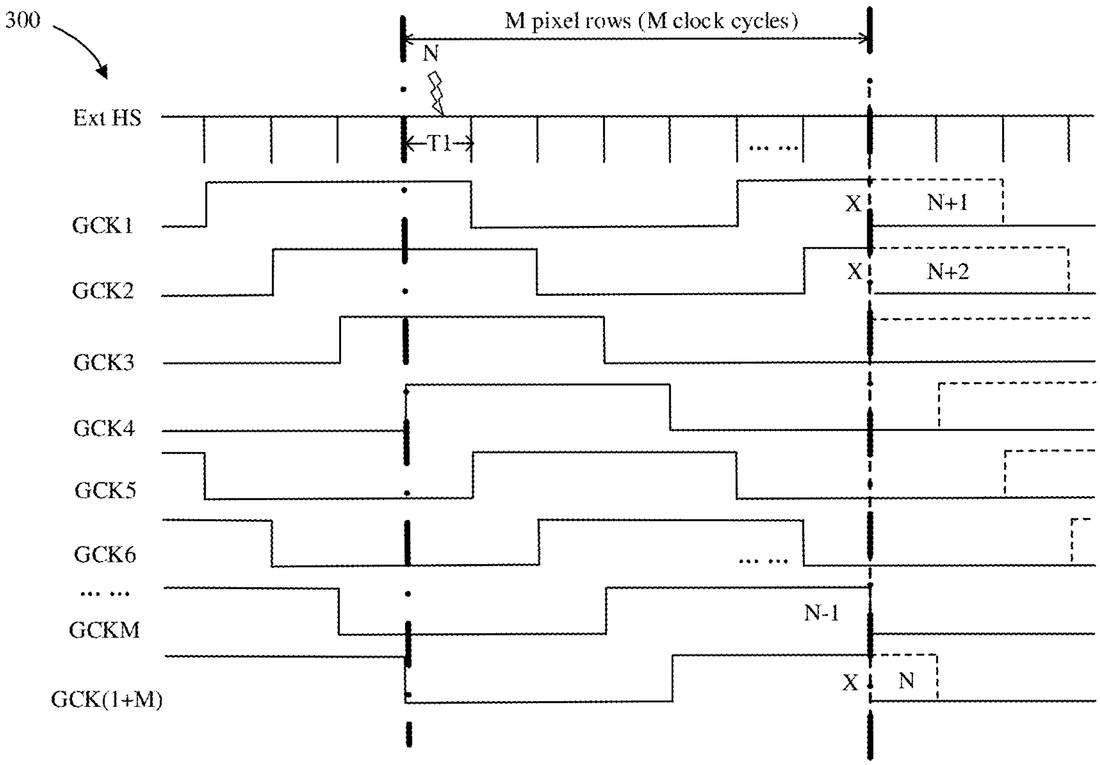
FIG. 3 is a schematic driving timing diagram illustrating a scheme in which a pre-charging scheme is adopted and combined with the scheme shown in FIG. 2, according to some embodiments of the present disclosure.

FIG. 3 is a schematic driving timing diagram illustrating a scheme in which a pre-charging scheme is adopted and combined with the scheme shown in FIG. 2, according to some embodiments of the present disclosure.

Referring to FIG. 3, when the pre-charging scheme is adopted, the start time of the gate driving signal for each pixel row is advanced by 3 clock cycles relative to the start time of the gate driving signal shown in FIG. 2 (i.e., relative to the start time of the displaying period). That is, the driving period corresponding to the gate driving signal for each pixel row includes a pre-charging period and a displaying period, the pre-charging period includes one or more clock cycles, and the displaying period includes one or more clock cycles. In FIG. 3, the start time of the pre-charging period is advanced by 3 clock cycles relative to the start time of the displaying period. Although the gate driving signal for each pixel row is output (for example, the voltage level of a corresponding gate driving signal GCK is pulled high) 3 clock cycles in advance, and pieces of display data for 3 pixel rows before that pixel row on the display panel will be sequentially written to that pixel row and will be sequentially displayed sequentially, because the expected to-be-displayed data (i.e., the expected brightness) for the pixel row will eventually be displayed within the displaying period of that pixel row, the displaying appears normal to the human eye.

As shown in FIG. 3, assuming that an error event in the to-be-displayed data for N-th pixel row (e.g., caused by interference events such as an ESD event) is detected within the first clock cycle T1, and at the end of M clock cycles (preset delay period) from the start time of the first clock cycle T1, the gates of the pixels on the N-th pixel row and the gates of the pixels on all subsequent pixel rows or a preset number of subsequent pixel rows are expected to be turned off. However, since the driving period corresponding to the gate driving signal includes multiple clock cycles (for example, 4 clock cycles in FIG. 3), when the gates of the pixels on these pixel rows are turned off, the driving periods corresponding to the gate driving signals GCK(1+M), GCK1 and GCK2 for N-th pixel row, the (N+1)-th pixel row and the (N+2)-th pixel row that are expected to be outputting have not ended, as shown by the symbol "X" in FIG. 3. Therefore, the pixels on these three pixel rows cannot receive new to-be-displayed data, and the to-be-displayed data for pixel rows before these three pixel rows will be written to these three pixel rows during the pre-charging process in their pre-charging periods. For example, assuming GCK (1+M) is used to drive the N-th pixel row, when turning off the gates of the pixels on the N-th pixel row, (N+1)-th pixel row and (N+2)-th pixel row, due to the pre-charging period, their gates may have been turned on in advance and the to-be-displayed data for the (N−1)-th pixel row has been written into the pixels on the N-th pixel row, (N+1)-th pixel row and (N+2)-th pixel row. Therefore, the N-th pixel row will display the stored data for the (N−1)-th pixel row. Similarly, the (N+1)-th pixel row and the (N+2)-th pixel row will also display the stored display data for the (N−1)-th pixel row, and the display data displayed by these three pixel rows is not the expected display data, so the user will perceive display abnormalities.

Therefore, for a display panel that adopts the pre-charging scheme, if the gates are still directly turned off at the start time of the displaying period of its gate driving signal, it will lead to the problem that driving periods corresponding to some gate driving signals cannot end, which will cause display abnormalities, as shown in FIG. 3.

The embodiments of the present disclosure propose a solution that considers to turn off, in advance, the gates of the pixels on the N-th pixel row (for which an error event occurs in the to-be-displayed data) and optionally the gates of the pixels on some pixel rows that will undergo the pre-charge process after the error event is detected. In this way, there will be no gate driving signal for which the driving period corresponding to the gate driving signal cannot end, so the display abnormalities as shown in FIG. 3 can be avoided.

Figure 4:
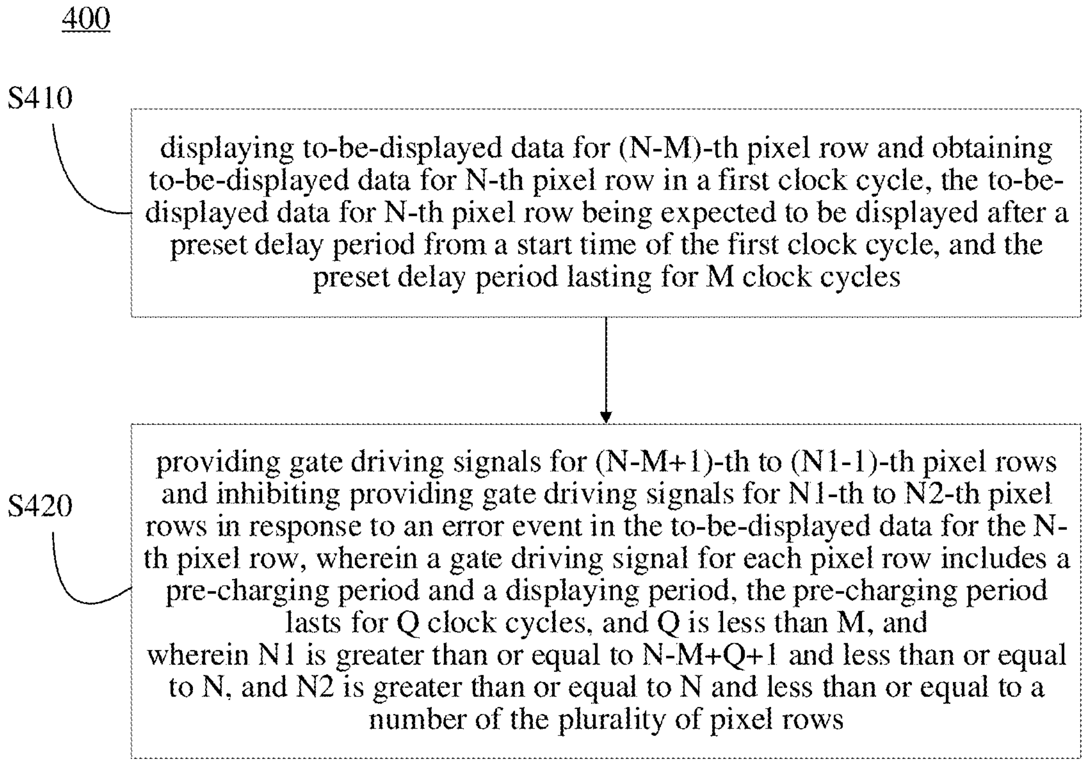
FIG. 4 shows a schematic flowchart of a method for driving a display panel according to at least one embodiment of the present disclosure.

FIG. 4 shows a schematic flowchart of a method for driving a display panel according to at least one embodiment of the present disclosure. The display panel may include a plurality of pixel rows, such as display panel 300 in FIG. 1.

For example, as shown in FIG. 4, in step S410, in a first clock cycle, to-be-displayed data for (N−M)-th pixel row is displayed and to-be-displayed data for N-th pixel row is obtained, wherein the to-be-displayed data for N-th pixel row is expected to be displayed after a preset delay period from a start time of the first clock cycle, and the preset delay period lasts for M clock cycles.

For example, as shown in FIG. 1, the plurality of first latches 104 of the display driving device receive to-be-displayed data (for example, video frame data or image data) to be displayed on the display panel, and the to-be-displayed data is processed in response to the enable signal to obtain corresponding analog data signals, and then the analog data signals are output to corresponding pixels in the display panel 300, such that the to-be-displayed data is displayed on the display panel after the preset delay period (M clock cycles). The preset delay period is used to provide the time required for internal processing. In this way, if no error event in the to-be-displayed data due to interference events of the data driver occurs, the to-be-displayed data for each pixel row is expected to be displayed after a preset delay period and on the display panel in a respective display period in response to a respective gate driving signal.

That is, in the first clock cycle when the to-be-displayed data for N-th pixel row is received, the to-be-displayed data for (N−M)-th pixel row that is received M clock cycles before is being displayed, and if there is no error in the to-be-displayed data for N-th pixel row, the to-be-displayed data for N-th pixel row is expected to be displayed M clock cycles later.

In step S420, in response to an error event in the to-be-displayed data for N-th pixel row, gate driving signals are provided to (N−M+1)-th to (N1−1)-th pixel rows, and provision of gate driving signals to N1-th to N2-th pixel rows are inhibited, where a gate driving signal for each pixel row includes a pre-charging period and a displaying period, and the pre-charging period lasts for Q clock cycles, Q being less than M, and wherein N1 is greater than or equal to (N−M+Q+1)-th and less than or equal to N, and N2 is greater than or equal to N and less than or equal to a number of the plurality of pixel rows.

As mentioned earlier, the display panel can be driven based on a pre-charging scheme in view of the comparatively large load, so that in this case the start time of the gate driving signal for each pixel row is advanced by a preset number of clock cycles relative to the start time of the displaying period for the pixel row, for example by 3 clock cycles as shown in FIG. 3, i.e., the driving period corresponding to the gate driving signal has 4 clock cycles and comprises a pre-charging period lasting for three clock cycles and a displaying period lasting for one clock cycle.

As mentioned earlier, the error event in the to-be-displayed data may be caused by interference events (e.g. an ESD event) within the data driver. In this case, the gates of the pixels on the N-th pixel row and optionally the gates of the pixels on some pixel rows that will undergo the pre-charge process after the error event is detected can be turned off (i.e., provision of gate driving signals for these pixel rows is inhibited) in advance. In this way, there will be no gate driving signal for which the driving period corresponding to the gate driving signal cannot end, so the display abnormalities as shown in FIG. 3 can be avoided.

Several implementations are described in detail below.

For example, in some implementations, N1 is equal to N, and N2 is equal to the number of all pixel rows of the display panel. In this case, the clock cycle in which the error event in the to-be-displayed data for N-th pixel row is detected is referred to as the first clock period. Because the error event does not occur in the to-be-displayed data for the (N−M)-th to (N−M+Q)-th pixel rows, and before the end time of the first clock period, the gate driving signals for (N−M)-th to (N−M+Q)-th pixel rows have been provided (i.e. the pre-charge process has started) and the corresponding driving periods have not ended within the first clock cycle, so in response to the error event, the gate driving signals for (N−M)-th to (N−M+Q)-th pixel rows can continue to be provided (ensuring that the driving periods of these gate driving signals can end normally). In addition, no error event occurs in the to-be-displayed data for (N−M+Q+1)-th to (N−1)-th pixel rows, and the gate driving signals for (N−M+Q+1)-th to (N−1)-th pixel rows have not yet started to be provided to the display panel within the first clock cycle, so these gate driving signals can be provided sequentially after the first clock cycle, so that the to-be-displayed data for (N−M+Q+1)-th to (N−1)-th pixel rows can be displayed normally. In addition, the provision of gate driving signals for N-th pixel row and all subsequent pixel rows may be inhibited, so that the to-be-displayed data in which the error event occurs and the to-be-displayed data for subsequent pixel rows that may be affected by the error event will not be displayed.

Figure 5:
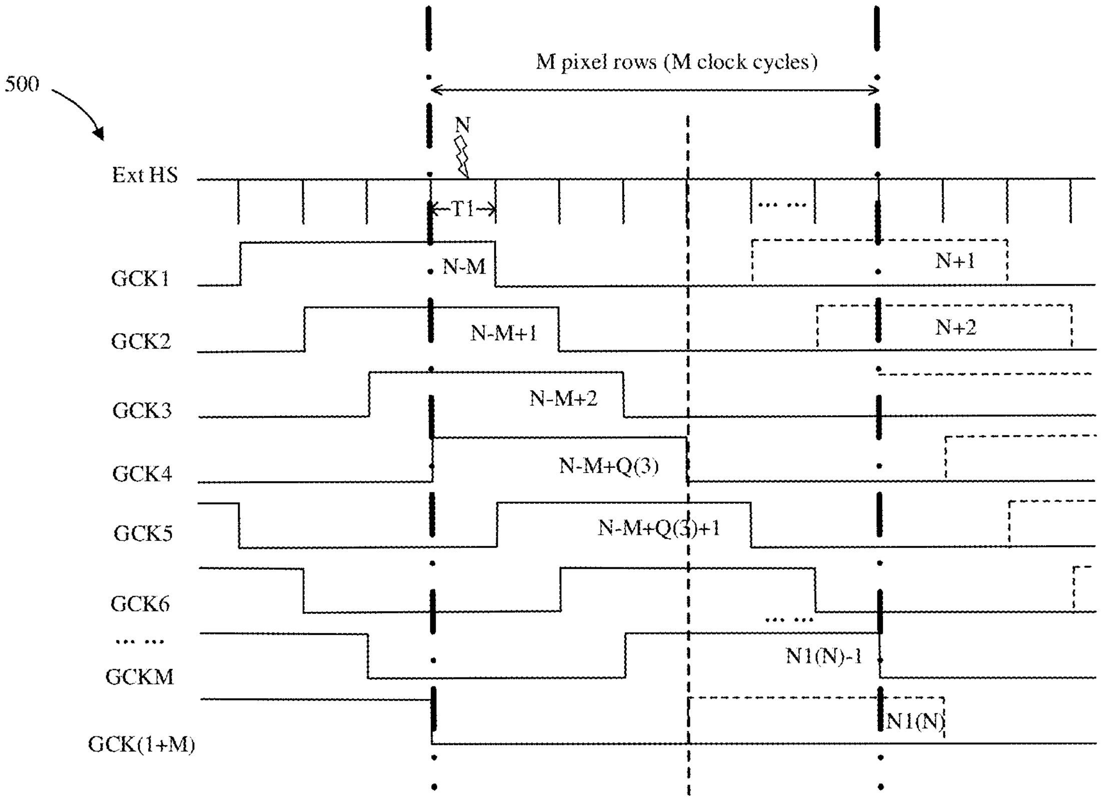
FIG. 5 shows a schematic driving timing diagram of an implementation according to at least one embodiment of the present disclosure.

As shown in FIG. 5, taking the number of clock cycles included in the pre-charging period Q=3 as an example, the error event in the to-be-displayed data for N-th pixel row is detected in the first clock cycle T1 corresponding to the displaying period of the gate driving signal GCK1 for (N−M)-th pixel row. In response to the error event, the gate driving signals for (N−M)-th to (N−M+3)-th pixel rows can continue to be provided (ensuring that the driving periods of these gate driving signals can end normally), and from the end time of the first clock cycle T1, the gate driving signals for (N−M+4)-th to (N−1)-th pixel rows are sequentially provided. In addition, the provision of the gate driving signals for N-th pixel row and all subsequent pixel rows (N+1, N+2, . . . , N2) can be inhibited.

As another example, in some implements, N1 is equal to N−M+Q+1, and N2 is equal to the number of all pixel rows of the display panel. In this case, similarly, in response to the error event, the gate driving signals for (N−M)-th to (N−M+Q)-th pixel rows that have been provided may continue to be provided within the first clock cycle in which the error event is detected (ensuring that the driving periods of these gate driving signals can end normally). In addition, even if no error event occurs in the to-be-displayed data for (N−M+Q+1)-th to (N−1)-th pixel rows, since the gate driving signals for (N−M+Q+1)-th to (N−1)-th pixel rows have not yet been provided within the first clock cycle (that is, the corresponding drive periods have not yet started), these gate driving signals can also be inhibited from being provided. In addition, it is also possible to inhibit providing the gate driving signals for N-th pixel row and all subsequent pixel rows, so that the to-be-displayed data in which the error event occurs and the to-be-displayed data for subsequent pixel rows that may be affected by the error event will not be displayed.

Figure 6:
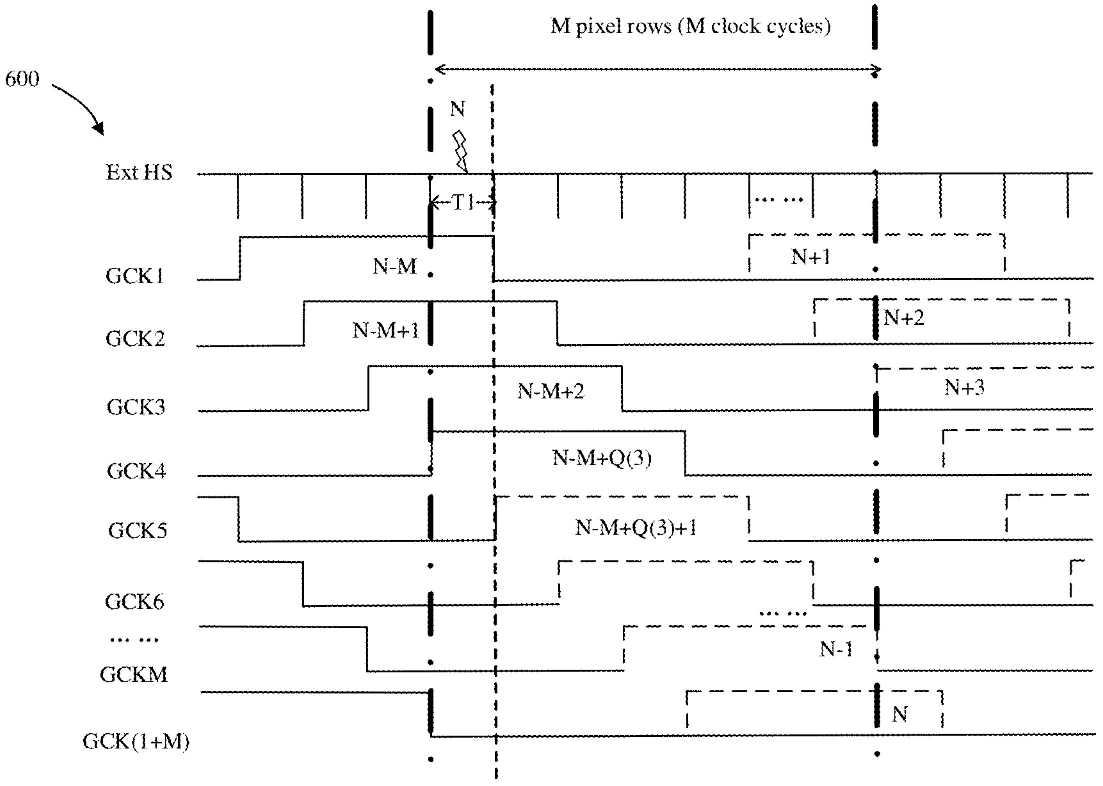
FIG. 6 shows a schematic driving timing diagram of an implementation according to at least one embodiment of the present disclosure.

As shown in FIG. 6, taking the number of clock cycles included in the pre-charging period Q=3 as an example, the error event in the to-be-displayed data for N-th pixel row is detected in the first clock cycle T1. In response to the error event, the gate driving signals for (N−M)-th to (N−M+3)-th pixel rows can continue to be provided within the first clock cycle (ensuring that the driving periods of these gate driving signals can end normally), and the provision of the gate driving signals for (N−M+4)-th to (N−1)-th pixel rows, the N-th pixel row, and all subsequent pixel rows (N+1, N+2, . . . , N2) is inhibited.

For another example, since N1 can be of any value greater than or equal to N−M+Q+1 and less than or equal to N, and N2 can also be of any value greater than or equal to N and less than or equal to the number of the plurality of pixel rows, so in other examples, N1=N−M+Q+2 and N2 is N+3 can be taken. Similarly, in response to the error event, the gate driving signals for (N−M)-th to (N−M+Q)-th pixel rows that have been provided can continue to be provided within the first clock cycle when the error event is detected (ensuring that the driving periods of these gate driving signals can end normally). In addition, because no error event occurs in the to-be-displayed data for (N−M+Q+1)-th pixel row, and the gate driving signal for (N−M+Q+1)-th pixel row has not been provided within the first clock cycle, the gate driving signal for (N−M+Q+1)-th pixel row may be provided after the first clock cycle. In addition, the provision of the gate driving signals for (N−M+Q+2)-th to N2-th (i.e., (N+3)-th) pixel rows may be inhibited, and the gate driving signals for (N2+1)-th (i.e., (N+4)-th) pixel row and subsequent pixel rows can be allowed to be provided (for example, when there is no longer an error event in the to-be-displayed data for the (N2+1)-th pixel row).

Figure 7:
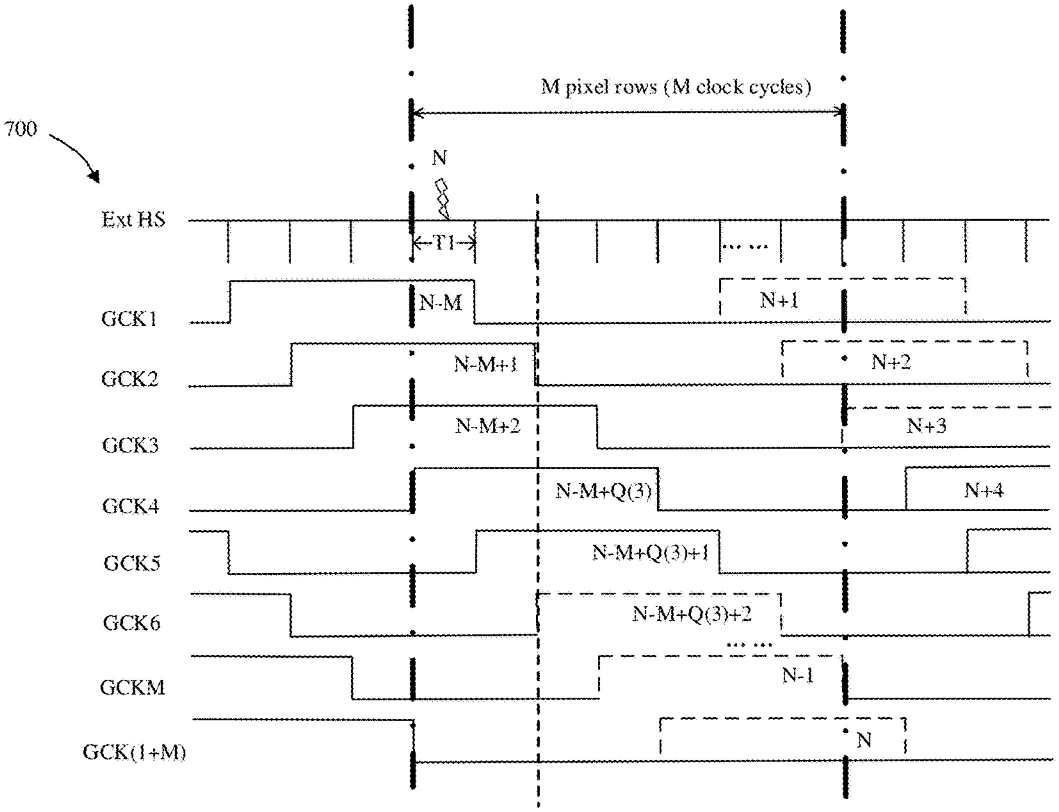
FIG. 7 shows a schematic driving timing diagram of an implementation according to at least one embodiment of the present disclosure.

As shown in FIG. 7, taking the number of clock cycles included in the pre-charging period Q=3 as an example, the error event in the to-be-displayed data for N-th pixel row is detected in the first clock cycle T1. In response to the error event, the gate driving signals for (N−M)-th to (N−M+3)-th pixel rows can continue to be provided within the first clock cycle (ensuring that the driving periods of these gate driving signals can end normally), and after the first clock cycle, the gate driving signal for (N−M+4)-th pixel row is allowed to be provided, the provision of the gate driving signals for (N−M+5)-th pixel row to (N+3)-th pixel row is inhibited, and the gate driving signals for (N+4)-th pixel row and all subsequent pixel rows are allowed to be provided.

For another example, in some embodiments, N1 is equal to N−p1, and N2 is equal to N+p2. Correspondingly, according to the previous value ranges of N1 and N2, it can be determined that p1 should be greater than or equal to 1 and less than or equal to M−Q−1 (i.e., N−p1 is greater than or equal to N−M+Q+1), and p2 should be greater than or equal to 1 and less than or equal to the number of all pixel rows of the display panel minus N (i.e., N+p2 is less than or equal to the number of all pixel rows of the display panel). Optionally, p1 and p2 can be preset values (i.e., fixed values determined in advance), and when an error event is detected in the to-be-displayed data for N-th pixel row, the provision of the gate driving signals for (N−p1)-th to (N+p2)-th pixel rows is inhibited, and the gate driving signals for other pixel rows can be provided normally. Alternatively, optionally, p1 is a preset value, and the value of p2 depends on the time when the error event is eliminated or on a number of subsequent pixel rows on the display panel after the N-th pixel row.

For example, as a specific example, p1 and p2 can be preset values of 1. In this way, as shown in FIG. 8, in response to the error event, the gate driving signals for (N−M)-th to (N−M+3)-th can continue to be provided within the first clock cycle (ensuring that the driving periods of these gate driving signals can end normally), and after the first clock cycle, the gate driving signals for (N−M+4)-th to (N−2)-th pixel rows can be provided sequentially, the provision of the gate driving signals for (N−1)-th to (N+1)-th pixel rows is inhibited, and the gate driving signals for (N+2)-th pixel row and all subsequent pixel rows (N+3, . . . , N) can be provided sequentially.

Of course, since the duration of the error event is usually long, in another specific example, p1 can be a preset value of 1, and p2 can be a value greater than 1. Here, p2 being the number of subsequent pixel rows after the N-th pixel row on the display panel is taken as an example.

Figure 8:
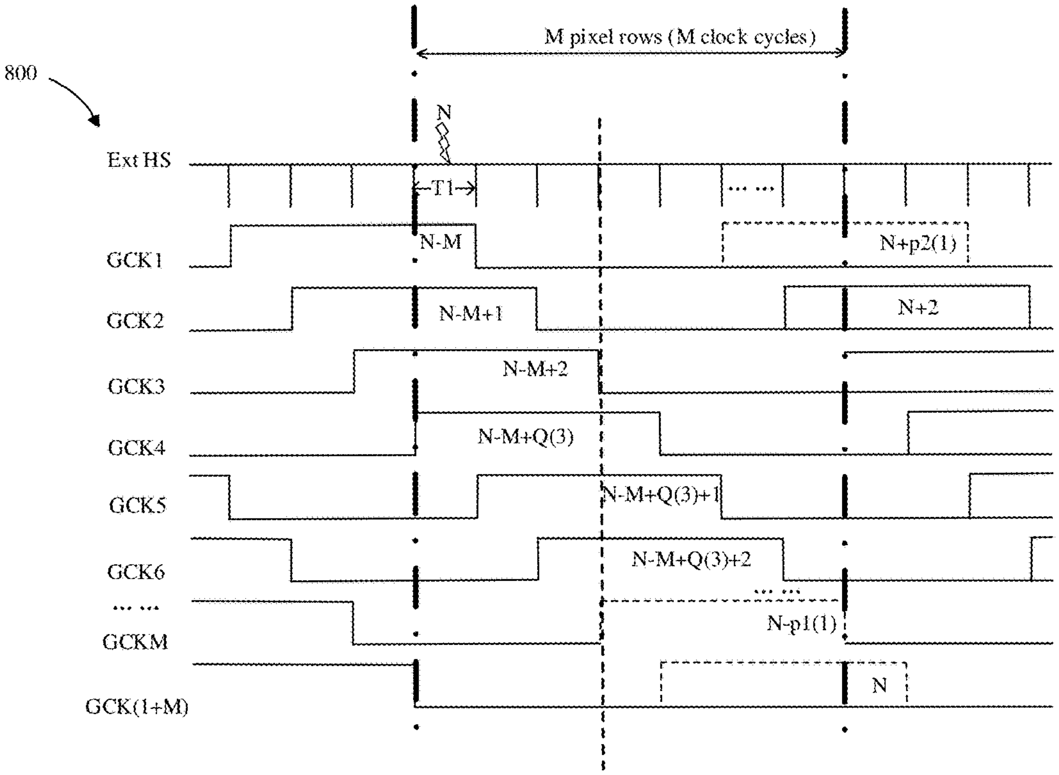
FIG. 8 shows a schematic driving timing diagram of an implementation according to at least one embodiment of the present disclosure.

In this specific example, in the driving timing diagram shown in FIG. 8, the gate driving signals for (N−M)-th to (N−M+3)-th pixel rows can continue to be provided (ensuring that the driving periods of these gate driving signals can end normally), and the newly generated gate driving signals for (N−M+4)-th to (N−2)-th pixel rows can continue to be provided, and the provision of the gate driving signals for (N−1)-th pixel row and all pixel rows (N, N+1, . . . ) subsequent to the (N−1)-th pixel row is inhibited.

In yet another specific example, p1 may be a preset value M−Q−2, and p2 is the number of subsequent pixel rows after the N-th pixel row on the display panel.

Figure 9:
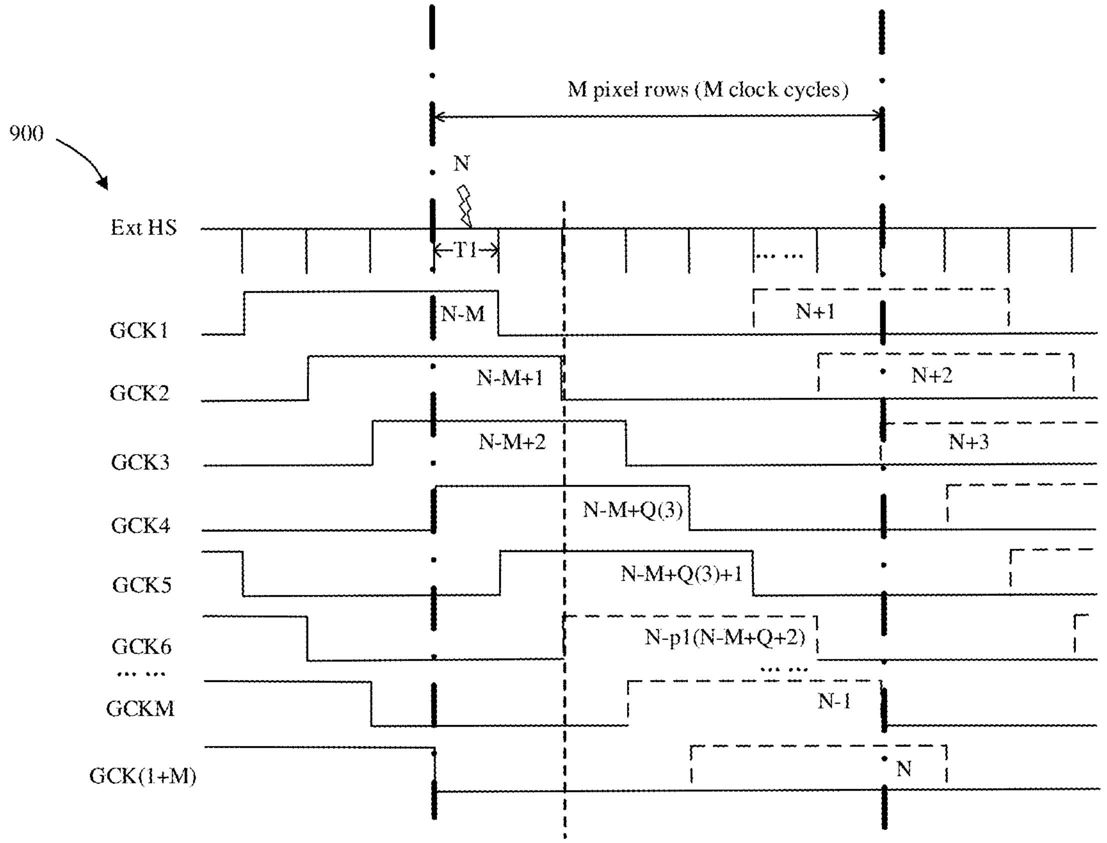
FIG. 9 shows a schematic driving timing diagram of an implementation according to at least one embodiment of the present disclosure.

In this way, as shown in FIG. 9, in response to the error event, the gate driving signals for (N−M)-th to (N−M+3)-th pixel rows can continue to be provided within the first clock cycle (ensuring that the driving periods of these gate driving signals can end normally), and after the first clock cycle, the newly generated gate driving signal for the (N−M+4)-th pixel row is provided and the provision of the gate driving signals for (N−M+5)-th pixel row and all subsequent pixel rows is inhibited.

It can be seen that through the above various embodiments, by stopping the gate driving signals for pixel rows on a pixel row basis, it is possible to turn off the gates of the pixels on the N-th pixel row corresponding to the to-be-displayed data where the error event occurs and its related pixel rows (for example, the pixel rows whose driving periods have not yet started within the clock cycle during which the error event occurs) in advance, so that during the display driving process, there will be no gate driving signal that stops in the pre-charging period, that is, the driving periods corresponding to all gate driving signals provided to the display panel can end normally. Therefore, it is possible to avoid display abnormalities in the gate driving scheme based on a pre-charging solution (for example, as shown in FIG. 3, some pixel rows are pre-charged only during the pre-charging period but pixels are not charged to the corresponding expected pixel voltages corresponding to the to-be-displayed data, so the to-be-displayed data cannot be displayed during the displaying period).

In some cases, as mentioned before, the interference events can be eliminated, so that starting from the to-be-displayed data for a certain pixel row subsequent to the N-th pixel row of the current display frame, or starting from the to-be-displayed data for a certain pixel row in a subsequent display frame, there is no longer error event in the to-be-displayed data. In these cases, after inhibiting the provision of the gate driving signal(s) to the display panel, the determination of when to provide the gate driving signal to the display panel again can be based on the time when the interference events are eliminated or when the error event of the to-be-displayed data is eliminated, i.e. the value of N2 depends on the time when the error event is eliminated.

For example, whether the error event occurs in the to-be-displayed data can be continuously detected. For example, if the error event is detected in the to-be-displayed data for one or more consecutive pixel rows, the provision of gate driving signals for at least the one or more consecutive pixel rows may be inhibited as previously described (if the error event has not been eliminated for a number of display frames, the inhibit operation may span multiple display frames). After it is detected that the error event is eliminated, for example, it is detected that there is no error in the obtained second to-be-displayed data for a second pixel row, the gate driving signal for at least the second pixel row is provided normally. For example, it is detected that there is no error event in the to-be-displayed data for (N+p2)-th pixel row and subsequent pixel rows for the current display frame, so the gate driving signals for (N+p2)-th pixel row and subsequent pixel rows for the current display frame can be provided normally. Alternatively, the error event in the to-be-displayed data may continue until a subsequent second display frame, and it is detected that there is no error event in the to-be-displayed data for a P-th pixel row and subsequent pixel rows for the second display frame, therefore, the gate driving signals for P-th pixel row and subsequent pixel rows for the second display frame can be provided normally. Optionally, in some embodiments, if the duration of the error event has reached a predetermined threshold (for example, a duration corresponding to a preset number of display frames), a reminder operation can be performed to notify relevant personnel for processing.

Alternatively, the value of N2 depends on the number of subsequent pixel rows after the N-th pixel row on the display panel. For example, for each display frame, if the error event in the to-be-displayed data for a certain pixel row is detected, the detection of the error event can be paused for that display frame, and the provision of the gate driving signals for at least the one pixel row and its subsequent pixel rows which are expected to be sequentially provided is inhibited (even if the error event has been eliminated). Further, for a next display frame, whether the error event has occurred is detected again, and it is determined whether to provide the gate driving signals based on a detection result. Optionally, in some embodiments, if a number of display frames in which the error event is detected has reached a predetermined number, a reminder operation may be performed to notify relevant personnel for processing.

According to another aspect of the present disclosure, a display driving device is also provided.

Figure 10:
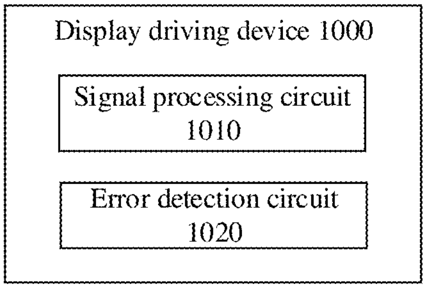
FIG. 10 shows a schematic structural block diagram of a display driving device according to at least one embodiment of the present disclosure.

FIG. 10 shows a schematic structural block diagram of a display driving device according to at least one embodiment of the present disclosure. The display driving device may be for driving a display panel comprising a plurality of rows of pixels, and may be integrated into one or more integrated circuits.

As shown in FIG. 10, the display driving device 1000 may include a signal processing circuit 1010 and an error detection circuit 1020. The signal processing circuit 1010 may be used to display to-be-displayed data for (N−M)-th pixel row and obtain to-be-displayed data for N-th pixel row in a first clock cycle, the to-be-displayed data for N-th pixel row being expected to be displayed after a preset delay period from a start time of the first clock cycle, and the preset delay period lasting for M clock cycles. The error detection circuit 1020 may be configured to detect an error event for each obtained to-be-displayed data when activated. In addition, the signal processing circuit 1010 is further configured to provide, in response to the error event in the to-be-displayed data for (N-th) pixel row, gate driving signals for (N−M+

1)-th to (N1−1)-th pixel rows and inhibit providing gate driving signals for N1-th to N2-th pixel rows, where a gate driving signal for each pixel row includes a pre-charging period and a displaying period, and the pre-charging period lasts for Q clock cycles, and Q is less than M, and where N1 is greater than or equal to N−M+Q+1 and less than or equal to N, and N2 is greater than or equal to N and less than or equal to a number of the plurality of pixel rows.

For example, the error detection circuit 1020 may remain activated, or error detection circuit 1020 may be activated for each display frame, e.g., may be deactivated for current display frame when an error event is detected and then reactivated for a next display frame, for detecting the error event in the to-be-displayed data. For example, if the error detection circuitry 1020 detects an error event in the to-be-displayed data for a certain pixel row, the provision of the gate driving signals for that pixel row and its associated pixel rows may be inhibited as previously described, and respective gate driving signals can be output normally after the error event has been detected to be eliminated. Therefore, the error detection circuit 1020 needs to remain activated in this case to continuously detect whether the error event has occurred and has been eliminated. Alternatively, for each display frame, if the error event in the display data for a certain pixel row is detected, the error detection circuit 1020 may be deactivated for the display frame, the provision of the gate driving signals for at least the pixel row and all subsequent pixel rows that are expected to be output sequentially is inhibited, and the error detection circuit 1020 is reactivated for the next display frame to detect whether the error event occurs, and determines whether to output gate driving signals based on a detection result.

At least a part of the signal processing circuit 1010 in FIG. 10 may be implemented by a part of the data driver 100 and the gate driver 200 shown in FIG. 1, and the display driving device may further include a control circuit (not shown), where the control circuit may be included in the signal processing circuit or the error detection circuit, or may be independent of the signal processing circuit or the error detection circuit. For example, a partial circuit of the signal processing circuit (such as a gate driver) can normally generate gate driving signals based on the clock signal, and when it is necessary to inhibit the provision of some gate driving signals to some pixel rows of the display panel, the control circuit may control to pull down corresponding output terminals of the partial circuit to ground or disconnect the same from corresponding pixel rows on the display panel, so that these pixel rows are not provided with the gate driving signals. For example, a switch circuit may be provided between the partial circuit of the signal processing circuit (such as a gate driver) and each pixel row of the display panel or a grounding terminal, so that the control circuit may generate switch control signals to control these switches to turn on and off, so as to control whether gate driving signals are provided to the pixel rows. Additionally or alternatively, the display driving device may further include a selection circuit for selectively connecting output terminals of the partial circuit of the signal processing circuit (such as a gate driver) to corresponding pixel rows, and the control circuit may provide a grouping control signal to the selection circuit, and so on.

Similarly, in some implementations, N1 is equal to N, and N2 is equal to the number of all pixel rows of the display panel. Within the first clock cycle, the driving periods corresponding to the gate driving signals for (N−M)-th to (N−M+Q)-th pixel rows have not ended, and the signal processing circuit 1010 is further configured to, in response to the error event, continue to provide the gate driving signals for (N−M)-th to (N−M+Q)-th pixel rows within the first clock cycle, and after the first clock cycle, provide the gate driving signals for (N−M+Q+1)-th to (N−1)-th pixel rows, and inhibit providing the gate driving signals for N-th pixel row and all subsequent pixel rows.

In other implementations, N1 is equal to N−M+Q+1, and N2 is equal to the number of the plurality of pixel rows. Within the first clock cycle, the driving periods corresponding to the gate driving signals for (N−M)-th to (N−M+Q)-th pixel rows have not ended, and the signal processing circuit 1010 is further configured to, in response to an error event, continue to provide the gate driving signals for (N−M)-th to (N−M+Q)-th pixel rows in the first clock cycle and after the first clock cycle, inhibit providing the gate driving signals for (N−M+Q+1)-th pixel row and its subsequent pixel rows.

In yet other implementations, N1 is equal to N−p1 and N2 is equal to N+p2. p1 and p2 are preset values. Or, p1 is a preset value, and the value of p2 depends on the time when the error event is eliminated or on the number of subsequent pixel rows on the display panel after the N-th pixel row. Therefore, for example, in the case where p1=1 and p2 is the number of the plurality of pixel rows minus N, in the first clock cycle, the driving periods corresponding to the gate driving signal for (N−M)-th to (N−M+Q)-th pixel rows have not ended, and the signal processing circuit 1020 is further configured to, in response to the error event, continue to provide the gate driving signals for (N−M)-th to (N−M+Q)-th pixel rows in the first clock cycle, and after the first clock cycle, provide the gate driving signals for (N−M+Q+1)-th to (N−2)-th pixel rows and inhibit providing the gate driving signals for (N−1)-th pixel row and its subsequent pixel rows.

Similarly, if the error detection circuit 1020 detects that there is no error event in the to-be-displayed data acquired by the signal processing circuit 1010, the signal processing circuit 1010 can latch the to-be-displayed data, release the latched data, and output it to the display panel after processing in response to a corresponding gate driving signal after the preset delay period.

For more operations of each circuit of the display driving device 1000, reference can be made to the previous description and will not be repeated here.

According to another aspect of embodiments of the present disclosure, a display device is also provided. The display device may be an electronic device, such as a mobile device or a non-mobile device.

The display device may include a display panel and a display driving device, which may be the display driving device described with reference to FIG. 11, and is used to drive a display operation of the display panel.

Depending on different design requirements, at least a part of the signal processing circuit or the aforementioned control circuit may be implemented in the form of hardware, firmware, software (i.e., program), or in any combination of the aforementioned three forms.

In terms of hardware form, at least a portion of the signal processing circuit or the aforementioned control circuit may be implemented in logic circuitry on an integrated circuit. Relevant functions of at least a part of the signal processing circuit or the aforementioned control circuit may be implemented in hardware using a hardware description language (e.g. Verilog HDL or VHDL) or other suitable programming languages. For example, the related functions of at least a part of the signal processing circuit or the aforementioned control circuit may be implemented in one or more microcontrollers, microprocessors, application-specific integrated circuits (ASICs), digital signal processors (DSPs), field programmable gate arrays (FPGAs) and/or various logical blocks, modules and circuits in other processing units.

In terms of software and/or firmware form, at least a part of the signal processing circuit or the aforementioned control circuit may be implemented using a general programming language (e.g., C or C++) or other suitable programming languages. Programming codes may be recorded/stored in a recording medium, and the aforementioned recording medium includes, for example, a read only memory (ROM), a storage device, and/or a random access memory (RAM). The programming codes may be accessed from a recording medium and executed by a computer, central processing unit (CPU), controller, microcontroller, or microprocessor to accomplish the relevant functions. As the recording medium, a "non-transitory computer-readable medium" such as a magnetic tape, a magnetic disk, a card, a semiconductor memory, or a programmed logic circuit can be used. Further, the programming codes may be provided to a computer (or CPU) via any transmission medium, such as a communication network or radio waves. The communication network is, for example, Internet, wired communication, wireless communication, or other communication medium.

It will be apparent to those skilled in the art that various modifications and variations can be made in the structure of the disclosed embodiments without departing from the scope or spirit of the present disclosure. In view of the foregoing, it is intended that the present disclosure cover modifications to and variations of the present disclosure which are within the scope of the appended claims and their equivalents.

The invention claimed is:

1. A method for driving a display panel comprising a plurality of pixel rows, the method comprising:

displaying to-be-displayed data for (N−M)-th pixel row and obtaining to-be-displayed data for N-th pixel row in a first clock cycle, the to-be-displayed data for N-th pixel row being expected to be displayed after a preset delay period from a start time of the first clock cycle, and the preset delay period lasting for M clock cycles; and providing gate driving signals for (N−M+1)-th to (N1−1)-th pixel rows and inhibiting providing gate driving signals for N1-th to N2-th pixel rows, in response to an error event in the to-be-displayed data for N-th pixel row, wherein a gate driving signal for each pixel row includes a pre-charging period and a displaying period, the pre-charging period lasts for Q clock cycles, and Q is less than M, and wherein N1 is greater than or equal to N−M+Q+1 and less than or equal to N, and N2 is greater than or equal to N and less than or equal to a number of the plurality of pixel rows.

2. The method of claim 1, wherein N1 is equal to N, and N2 is equal to the number of the plurality of pixel rows, wherein, in the first clock cycle, driving periods corresponding to the gate driving signals for (N−M)-th to (N−M+Q)-th pixel rows have not ended, and wherein, in response to the error event, the gate driving signals for (N−M)-th to (N−M+Q)-th pixel rows continue to be provided during the first clock cycle, and after the first clock cycle, the gate driving signals for (N−M+Q+1)-th to (N−1)-th pixel rows are provided, and the gate driving signals for N-th pixel row and all subsequent pixel rows are inhibited from being provided.

3. The method of claim 1, wherein N1 is equal to N−M+Q+1, and N2 is equal to the number of the plurality of pixel rows, wherein, in the first clock cycle, driving periods corresponding to the gate driving signals for (N−M)-th to (N−M+Q)-th pixel rows have not ended, and wherein, in response to the error event, the gate driving signals for (N−M)-th to (N−M+Q)-th pixel rows continue to be provided during the first clock cycle, and after the first clock cycle, the gate driving signals for (N−M+Q+1)-th pixel row and all subsequent pixel rows are inhibited from being provided.

4. The method of claim 1, wherein N1 is equal to N−p1, and N2 is equal to N+p2, wherein, p1 and p2 are preset values; or wherein p1 is a preset value, and a value of p2 depends on when the error event is eliminated or on a number of subsequent pixel rows after the N-th pixel row on the display panel.

5. The method of claim 4, wherein p1=1, and p2 is the number of subsequent pixel rows after the N-th pixel row, wherein, in the first clock cycle, driving periods corresponding to the gate driving signals for (N−M)-th to (N−M+Q)-th pixel rows have not ended, and wherein, in response to the error event, the gate driving signals for (N−M)-th to (N−M+Q)-th pixel rows continue to be provided during the first clock cycle, and after the first clock cycle, the gate driving signals for (N−M+Q+1)-th to (N−2)-th pixel rows are provided and the gate driving signals for (N−1)-th and all subsequent pixel rows are inhibited from being provided.

6. The method of claim 1, wherein a value of N2 depends on when the error event is eliminated or on a number of subsequent pixel rows after the N-th pixel row on the display panel.

7. The method of claim 1, wherein the gate driving signal for each pixel row on the display panel is shifted based on a clock cycle, and wherein a start time of the displaying period for N-th pixel row is a time after M clock cycles from the start time of the first clock cycle.

8. The method of claim 1, wherein the N-th pixel row performs display based on to-be-displayed data for N-th pixel row of a previous display frame when not being provided with a corresponding gate driving signal.

9. The method of claim 1, wherein the error event is caused by interference events including an electrostatic discharge (ESD) event.

10. The method of claim 1, further comprising:

latching the to-be-displayed data for N-th pixel row and allowing a corresponding gate driving signal for N-th pixel row to be provided, in response to an absence of the error event in the to-be-displayed data; and releasing the latched to-be-displayed data in response to a release enable signal, so that the to-be-displayed data is enabled to be displayed in a respective displaying period in response to the corresponding gate driving signal.

11. The method of claim 1, wherein displaying to-be-displayed data for (N−M)-th pixel row comprises:

converting the to-be-displayed data for (N−M)-th pixel row into analog data signals and providing the same to the (N−M)-th pixel row, such that pixels on the (N−M)-th pixel row perform display according to the analog data signals.

12. A display driving device for driving a display panel comprising a plurality of pixel rows, comprising:

a signal processing circuit configured to display to-be-displayed data for (N−M)-th pixel row and obtain to-be-displayed data for N-th pixel row in a first clock cycle, the to-be-displayed data for N-th pixel row being expected to be displayed after a preset delay period from a start time of the first clock cycle, and the preset delay period lasting for M clock cycles; and an error detection circuit configured to detect an error event for each obtained to-be-displayed data when activated;

wherein the signal processing circuit is further configured to provide, in response to the error event in the to-be-displayed data for the (N-th) pixel row, gate driving signals for (N−M+1)-th to (N1−1)-th pixel rows and inhibit providing gate driving signals for N1-th to N2-th pixel rows, wherein a gate driving signal for each pixel row includes a pre-charging period and a displaying period, and the pre-charging period lasts for Q clock cycles, and Q is less than M, and wherein N1 is greater than or equal to N−M+Q+1 and less than or equal to N, and N2 is greater than or equal to N and less than or equal to a number of the plurality of pixel rows.

13. The display driving device according to claim 12, wherein N1 is equal to N, and N2 is equal to the number of the plurality of pixel rows, wherein, in the first clock cycle, driving periods corresponding to the gate driving signals for (N−M)-th to (N−M+Q)-th pixel rows have not ended, and wherein, the signal processing circuit is configured to: in response to the error event, continue to provide the gate driving signals for (N−M)-th to (N−M+Q)-th pixel rows during the first clock cycle, and after the first clock cycle, provide gate driving signals for (N−M+Q+1)-th to (N−1)-th pixel rows and inhibit provision of the gate driving signals for N-th pixel row and all subsequent pixel rows.

14. The display driving apparatus according to claim 12, wherein N1 is equal to N−M+Q+1, and N2 is equal to the number of the plurality of pixel rows, wherein, in the first clock cycle, driving periods corresponding to the gate driving signals for (N−M)-th to (N−M+Q)-th pixel rows have not ended, and wherein, the signal processing circuit is configured to: in response to the error event, continue to provide the gate driving signals for (N−M)-th to (N−M+Q)-th pixel rows during the first clock cycle, and after the first clock cycle, inhibit provision of the gate driving signals for (N−M+Q+1)-th pixel row and all subsequent pixel rows.

15. The display driving device of claim 12, wherein N1 is equal to N−p1, and N2 is equal to N+p2, wherein, p1 and p2 are preset values; or wherein p1 is a preset value, and a value of p2 depends on when the error event is eliminated or on a number of subsequent pixel rows after the N-th pixel row on the display panel.

16. The display driving device of claim 15, wherein p1=1, and p2 is the number of the plurality of pixel rows minus N, wherein, in the first clock cycle, driving periods corresponding to the gate driving signals for (N−M)-th to (N−M+Q)-th pixel rows have not ended, and wherein, the signal processing circuit is configured to: in response to the error event, continue to provide the gate driving signals for (N−M)-th to (N−M+Q)-th pixel rows during the first clock cycle, and after the first clock cycle, provide the gate driving signals for (N−M+Q+1)-th to (N−2)-th pixel rows and inhibit provision of the gate driving signals for (N−1)-th and all subsequent pixel rows.

17. The display driving device of claim 12, wherein a value of N2 depends on when the error event is eliminated or on a number of subsequent pixel rows after the N-th pixel row on the display panel.

18. A display device comprising:

a display panel; and a display driving device according to claim 12, for driving the display panel.

* * * * *